United States Patent [19]

Akashi et al.

[11] 4,135,031

[45] Jan. 16, 1979

[54] MAGNETIC RECORDING SUBSTANCE

[75] Inventors: Goro Akashi; Masaaki Fujiyama; Masahiro Utumi, all of Odawara, Japan

[73] Assignee: Fuji Photo Film Co., Ltd., Minami-ashigara, Japan

[21] Appl. No.: 771,547

[22] Filed: Feb. 24, 1977

[30] Foreign Application Priority Data

Feb. 24, 1976 [JP] Japan ................................ 51-18491

[51] Int. Cl.² .............................................. B32B 5/16
[52] U.S. Cl. .................................. 428/323; 427/128; 427/129; 427/130; 427/131; 427/132; 428/173; 428/331; 428/409; 428/446; 428/539; 428/900; 360/134
[58] Field of Search ............... 428/900, 539, 172, 173, 428/446, 409, 179, 337, 323; 427/128–132; 360/134

[56] References Cited

U.S. PATENT DOCUMENTS 3,734,772  5/1973  Schaell .................................. 360/134
3,995,089  11/1976  Hartmann et al. .................... 428/900

Primary Examiner—Marion E. McCamish
Assistant Examiner—E. Rollins Buffalow
Attorney, Agent, or Firm—Armstrong, Nikaido, Marmelstein & Kubovcik

[57] ABSTRACT

In a magnetic recording substance comprising a magnetic recording layer on one side of a non-magnetic support and a back layer on the other side thereof, the back layer is provided by coating a powdered solid with a binder and coating solvent and having spike grains with a height of 0.8 to 5 microns and an interval or pitch of at least 200 microns on the surface thereof and a friction coefficient of at least 0.25.

12 Claims, 1 Drawing Figure

(A)

(B)

(C)

(A) 
(B) 
(C) 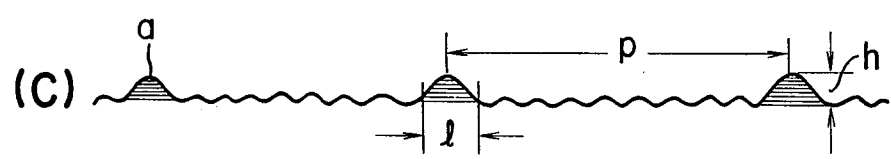

MAGNETIC RECORDING SUBSTANCE

BACKGROUND OF THE INVENTION

1. Field of the Invention

This invention relates to a magnetic recording substance and more particularly, it is concerned with an improvement in the back layer of a magnetic recording medium such as broadcasting video tapes, helical video tapes and high density recording tapes similar thereto.

2. Description of the Prior Art

In order to improve the running property of a magnetic recording substance, it has hitherto been conducted to roughen the back layer of the magnetic recording substance, for example, by one of the following methods:

(1) sandblasting the base surface reverse to the magnetic layer, (2) coating the reverse side to the magnetic layer with a powder of carbon black, graphite, kaolin, barium sulfate, silicon dioxide, titanium oxide, etc. with a binder, and (3) controlling the transparency or lightness of the coating layer of the above described method (2) to detect coating defects and to improve the marking property.

In these known techniques, the method (2) using a layer composed of a powder of carbon black, graphite, titanium oxide, etc. in a binder has the following problems:

(1) When the surface of a magnetic layer is smoothened mirror-like as in video tapes, the scattering of the edges of a tape wound takes place.

(2) When a tape is subjected to fast forward or sudden stopping, the tape loosening takes place.

(3) The surface unevenness of the back layer affects a magnetic layer to increase the modulation noise.

These phenomena become remarkable with the increase of a tape width or a tape speed and thus appear often in the case of using a long tape with 2 inch width × 2195 m or 2 inch width × 2880 m in a high tape speed recorder such as AVR-1 of Ampex type VTR.

SUMMARY OF THE INVENTION

It is an object of the present invention to provide a magnetic recording substance suitable for use as broadcasting video tapes or high density recording tapes.

It is another object of the present invention to provide a magnetic recording medium having a magnetic recording layer and a back layer.

It is a further object of the present invention to improve the back layer of a magnetic recording tape.

These objects can be attained by a magnetic recording substance comprising a magnetic recording layer on one side of a non-magnetic support and a back layer on the other side thereof, the back layer being provided by coating a powdered solid with a binder and having spike grains with a height of 0.8 to 5 microns and an interval of 200 microns or more on the surface thereof and a friction coefficient of 0.25 or more.

BRIEF DESCRIPTION OF THE DRAWING

The FIGURE is to illustrate the surface property of back layers, in which (A) shows a smooth surface in the prior art, (B) shows a roughened surface to improve the running property in the prior art and (C) shows a particularly processed surface according to the present invention.

DETAILED DESCRIPTION OF THE INVENTION

We, the inventors, have made various studies in order to develop a magnetic recording substance whereby the above described disadvantages are overcome and, consequently, have found the following facts. That is to say, it has been regarded to be ideal that a magnetic layer and a back layer provided on the reverse side to the magnetic layer have both smooth surfaces when the electromagnetic conversion property is important, since the modulation noise of a video tape becomes worse as the surface of the magnetic layer is roughened, but, according to the inventors' studies, it is found that spike grains provided on the reverse side to the magnetic layer with a pitch of 200 microns or more scarcely increase the modulation noise and when these spike grains have a height of 0.8 to 5 microns, in particular, the edges of a tape wound at a high tape speed are well-ordered even if the friction coefficient to the magnetic layer is low and there occurs no tape loosening even if the tape is suddenly stopped as the tape end is in a free state. This is possibly due to that (1) air is less caught in between tapes, (2) the spike grains act against the magnetic layer to prevent the tape from stepping out lengthwise or laterally, (3) finger marks or the like is hard to adhere and (4) the contact area with a guide pole is decreased to thus lower the static charge build-up.

Referring to the accompanying drawing, FIGS. (A), (B) and (C) show respectively a smooth back layer, a back layer which running property is improved and a back layer according to the present invention in which "a" is a spike grain, "l" is the diameter thereof, "h" is the height thereof and "p" is the pitch or interval between the spike grains.

In the present invention, the pitch between spike grains is 200 microns or more, preferably 200 to 10000 microns, the height of the spike grain is 0.8 to 5 microns, preferably 0.8 to 3 microns and the diameter thereof is 8 microns or more, preferably 8 to 20 microns. The surface electrical resistance of the reverse side to a magnetic layer, provided with spike grains, is generally $10^{10}\Omega$ or less, preferably $10^{8}\Omega$ or less and the friction coefficient is 0.23 or more to a magnetic layer and 0.25 or more to an alumite roll.

Provision of spike grains according to the present invention is ordinarily carried out by adding a relatively coarse powder to other components for forming a back layer, followed by dispersing while controlling the dispersion time to vary the dispersed state. The thickness on dry base of the back layer is ordinarily 0.5 to 10 microns, preferably 0.8 to 5 microns and the proportion by weight of the spike grains to the total weight of the back layer ranges from 1/1000 to 30/1000.

Useful examples of the materials for such spike grains are talc, titanium oxide, zinc oxide (ZnO), lithophone, complex of zinc sulfide and zinc sulfate, aluminum oxide, silicon carbide, kaolin, carbon, barium sulfate ($BaSO_4$), silicon dioxide ($SiO_2$), barium carbonate ($BaCO_3$), etc. Above all, talc, lithophone and complex of zinc sulfide and zinc sulfate are preferable. These spike grains can be used individually or in combination. For the purpose of provision of spike grains to satisfy the above described conditions, there are several methods, for example, comprising (1) adding an inorganic powder having a grain size corresponding to a desired spike grain to a coating composition at the final time of dispersion, (2) adding an inorganic powder having a grain size of somewhat larger than that of a desired spike grain to a coating composition at the initial time of dispersion and dispersing the mixture while controlling the dispersion time to obtain a desired spike grain size, (3) causing pigment grains to be aggregated and (4) adding two kinds of inorganic powders differing in grain size to a coating composition simultaneously or separately while controlling the dispersion time to obtain a desired spike grain size. In the last case, one inorganic power has generally a grain size of 0.02 to 5 microns, preferably 0.1 to 3 microns and the other inorganic powder has generally a grain size of 2 to 40 microns, preferably 5 to 30 microns.

In the present invention, a magnetic recording layer and a back layer can be provided in conventional manner as illustrated below.

Process for preparing magnetic coating compositions used in the present invention are described in detail in, for example, Japanese Patent Publication Nos. 15/1960, 26794/1964, 186/1968, 28043/1972, 28045/1972, 28046/1972, 28048/1972, 31445/1972, 11162/1973, 21331/1973 and 33683/1973 and Russian Pat. No. 308,033. These magnetic coating compositions contain predominantly ferromagnetic powders, binders and coating solvents, optionally with dispersing agents, lubricants, abrasives and antistatic agents.

Suitable binders which can be used in the present invention include hitherto known thermoplastic resins, thermosetting resins and mixtures thereof.

Useful examples of the ferromagnetic fine powders which can be used in the present invention are, for example, $\gamma$-Fe$_2$O$_3$, Co-doped $\gamma$-Fe$_2$O$_3$, Fe$_3$O$_4$, Co-doped Fe$_3$O$_4$, Berthollide compounds of $\gamma$-Fe$_2$O$_3$ and Fe$_3$O$_4$ (FeO$_x$: 1.33<x<1.50), Co-doped Berthollide compounds of $\gamma$-Fe$_2$O$_3$ and Fe$_3$O$_4$ (FeO$_x$: 1.33<x<1.50), CrO$_2$, Co—Ni—P alloys, Co—Ni—Fe alloys, Co—Ni—Fe—B alloys, Fe—Ni—Zn alloys, Fe—Mn—Zn alloys, Fe—Co—Ni—P alloys and Ni—Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973, U.S. Pat. Nos. 3,026,215, 3,031,341, 3,100,194, 3,242,005, 3,389,014, British Pat. Nos. 752,659, 782,762 and 1,007,323, French Pat. No. 1,107,654 and West German Pat. OLS No. 1,281,334.

The ferromagnetic fine powders have a particle size of about 0.2 to 1 microns in length with a length to width ratio of 1 : 1 to 20 : 1.

Suitable thermoplastic resins are those which have a softening point of about 150° C. or lower, a mean molecular weight of about 10,000 to 200,000 and a degree of polymerization of the order of about 100 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycols, high molecular weight diols and triphenylmethane triisocyanates, polyamine resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally employed in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539, 3,687,725, *IBM Technical Disclosure Bulletin*, Vol. 9, No. 7 page 779 (December 1966), and *ELECTRONIK*, No. 12, page 380 (1961), West Germany.

Typical abrasive agents which can be used in the present invention include fused alumina, silicon carbide, chromium oxide, corundum, diamond, synthetic diamond, garnet, emery (main component: corundum and magnetite), and the like. These abrasive agents are used which an average particle size of about 0.05 to 5 $\mu$m, preferably about 0.1 to 2 $\mu$m. These abrasive agents are described in Japanese Patent Application No. 26749/1973, U.S. Pat. Nos. 3,007,807 3,041,196, 3,293,066, 3,630,910, 3,687,725, British Pat. No. 1,145,349, West German Pat. No. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g., higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda, et al., *Kaimen kassei Zai no Gosei to so no Oyo (Synthesis of Surface Active Agents and Their Applications)*, Maki Shoten, Tokyo (1964), A. M. Schwarts et al., *Surface Active Agents*, Interscience Publications Corp., New York (1958), J. P. Sisley et al., *Encyclopedia of Surface Active Agents*, Vol, 2, Chemical Publishing Co., New York (1964), *Kaimen Kassei Zai Binran (Handbook of Surface Active Agents)*, 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc, and non-magnetic metals, for example, copper, aluminum, zinc, etc. Such a non-magnetic support can have a thickness of about 3 to 100 $\mu$m, preferably 5 to 50 $\mu$m in the form of a film or sheet.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, *Paint Flow and Pigment Dispersion*, published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in *Coating Kokagu (Coating Engineering)*, page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; ene chlorohydrin, dichlorobenzene and the like.

The magnetic layer coated onto a support in this way is dried after, if necessary, the coating has been subjected to a treatment for orientating the magnetic powder in the layer. If desired, the magnetic layer can be subjected to a surface smoothening treatment or cut in a desired shape to thus form the magnetic recording substance of the present invention. In this case, the orientating magnetic field can be either an AC or DC magnetic field with a field strength of about 500 to 2000 gauss. The drying temperature can range from about 50 to about 100° C. and the drying time is about 3 to 10 minutes.

Suitable orientating methods of magnetic powders are disclosed in U.S. Pat. Nos. 1,949,840, 2,796,359, 3,001,891, 3,172,776, 3,416,949, 3,473,960 and 3,681,138; Japanese Patent Publication Nos. 3427/1957, 28368/1964, 23624/1965, 23625/1965, 13181/1966, 13043/1973 and 39722/1973.

The orientating direction of the magnetic substance is determined depending upon the intended use thereof. That is to say, the direction is parallel to the lengthwise direction of a tape in the case of sound tapes, small sized video tapes and memory tapes, and inclined by about 30 to 90 degrees to the lengthwise direction in the case of broadcasting video tapes.

In the present invention, furthermore, the support is subjected to back coating on the reverse side to the magnetic layer. Suitable back coating techniques which can be used in the present invention are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688.

Suitable solid powders which can be used are carbon black, graphite, kaolin, barium sulfate, silicon dioxide, titanium oxide, talc, zinc oxide, etc. and as a binder, there are used various thermoplastic resins and thermosetting resins as described hereinbefore. These components are mixed with an organic solvent to prepare a coating composition as in the case of the magnetic layer and then applied to the reverse side of a support to the magnetic layer to thus form a back layer.

According to the present invention, there are obtained the following advantages or merits:

1. Increase of the modulation noise can be minimized in spite of the presence of coarse grains on the reverse side to the magnetic layer.
2. The edges of a tape wound at a high tape speed are well-ordered, so the fluctuation of signal output due to tape deformation can be decreased.
3. There takes place no tape loosening even if the tape is suddenly stopped as the tape end is in a free state.
4. There takes place no step-out of the wound edges a long tape near the core.
5. Increase of the drop out can markedly be suppressed.
6. The tolerance of the electric resistance of a back layer is increased, that is, the static charge build-up is lowered for a same electric resistance.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples.

EXAMPLES

On one surface of a polyethylene terephthalate base with a thickness of 20 microns was provided a magnetic layer and on the other surface was provided a back layer. As this magnetic layer, an ordinary magnetic recording layer was coated and dried to give a thickness of 12 microns on dry base, since it is only required in the present invention that the surface property after the calendering treatment is within such a range that a recording wavelength of 4 microns is not hindered as in the ordinary broadcasting video tapes. On the other hand, the back layer was coated to give a thickness of about 2 microns after dried, using the following composition and changing the combination of powders.

| | |
|---|---|
| Carbon Black | 300 g |
| Polyurethane Resin | 120 g |
| Powder A | 300 g |
| Powder B | Variable |
| Saran Resin | 180 g |
| Isocyanate | 100 g |
| Methyl Ethyl Ketone | 1000 g |

These compositions were ball milled and used as a coating composition to obtain samples in which various spike grains were formed by changing the variety and dispersed state of Powder A and Powder B. The resulting samples were cut in a width of 2 inches and then subjected to assessment of various properties using a VTR made by Ampex, AVR-1.

The tape loosening was assessed by examining the presence of tape gap formed by sudden stopping at fast forwarding, rewinding or ending. The winding edges were assessed by viewing with the naked eye how the tape edges were ordered after fast forwarding or rewinding. The step-out of core side was assessed by examining wrinkles occurring near the reel core due to the inertia of the tape at the time of sudden stopping during fast forward or rewind, or at the time of mode exchange during fast forward or rewind. The modulation noise was assessed by recording and reproducing a color bar signal and examining the color noise component. These results are shown in Table 1, in which the assessments of the tape loosening, wound edges, step-out of core side, etc. are indicated by "Excellent", "Good" and "Passable".

Table 1

| Sample No. | Powder A | Powder B (g) | | Dispersing Time (hr) | Shape of Spike Grains | | | Tape Loosening | Wound Edges | Modulation Noise | Step-out of Core Side | Coefficient of Friction |
|---|---|---|---|---|---|---|---|---|---|---|---|---|
| | | | | | Pitch p ($\mu$) | Height h ($\mu$) | Diameter l ($\mu$) | | | | | |
| 1 | Talc powder with a mean grain size of 1.2 $\mu$ | 30 | Talc powder with a mean grain size of 7 $\mu$ | 50 | 200–500 | 0.8–1 | 8–10 | Excellent | Excellent | 0 | Excellent | 0.31 |
| 2 | | 20 | | 40 | 300–700 | 0.8–1 | 9–12 | " | " | +0.2 | " | 0.3 |
| 3 | | 15 | | 30 | 500–1500 | 0.9–1.5 | 9–15 | " | " | 0 | " | 0.29 |
| 4 | | 10 | | 30 | 2000–5000 | 1–2 | 9–15 | " | " | +0.5 | " | 0.285 |
| 5 | | 5 | | 15 | 3000–7000 | 2–3 | 9–20 | " | " | +0.5 | " | 0.28 |
| 6 | | 3 | | 10 | 5000–10000 | 2–5 | 9–20 | " | " | +0.8 | " | 0.27 |
| 7 | | 0 | | 50 | — | — | — | Passable | Passable | 0 | Passable | 0.2 |
| 8 | Talc powder with a mean grain size of 2 $\mu$ | 10 | Talc powder with a mean grain size of 20 $\mu$ | 100 | 300–600 | 0.8–1.5 | 9–15 | Excellent | Excellent | +0.2 | Excellent | 0.29 |
| 9 | | 5 | | 100 | 500–1000 | 0.8–1.5 | 9–15 | " | " | +0.2 | " | 0.28 |
| 10 | | 3 | | 50 | 700–3000 | 1–2 | 10–20 | " | " | +0.5 | " | 0.27 |
| 11 | | 1 | | 50 | 1000–10000 | 1–2 | 10–20 | " | " | +0.5 | " | 0.25 |

Table 1-continued

| Sample No. | Powder A | Powder B (g) | Dispersing Time (hr) | Shape of Spike Grains | | | Tape Loosening | Wound Edges | Modulation Noise | Step-out of Core Side | Coefficient of Friction |
| --- | --- | --- | --- | --- | --- | --- | --- | --- | --- | --- | --- |
| | | | | Pitch p (μ) | Height h (μ) | Diameter 1 (μ) | | | | | |
| 12 | Talc. powder with a mean grain size of 20 μ | — | 35 | No spike grains | | | Good | Good | +4 dB | " | 0.28 |

The following matters will be apparent from the results shown in Table 1. Samples No. 1 to 6 and 8 to 11 having spike grains according to the present invention show very excellent results in respect of the tape loosening, state of wound edges, step-out of core side, etc. If the height of the spike grain is too large, deterioration of the modulation noise is observed. However, there is no deterioration within a range of 1.5 microns or less and this effect can be neglected in practice within a range of 1.5 to 3 microns although some deterioration is found. The allowable upper limit is thus regarded as 5 microns. If the pitch of the spike grain is 200 microns or more, moreover, there is scarcely found any hindrance. This well agrees with the results of the inventors' analysis of the modulation noise that the frequency component, particularly marked as color noise, is 150 microns or less. The size of the spike grain, corresponding to the diameter thereof, is observed to be larger than that of the powder grain added for spike, which is possibly due to that some aggregation of the grains occurs during the step of drying after the coating. When the size of the grain is within a range of 8 to 20 microns, there is no hindrance. A size of less than 5 microns is not desirable because the mechanical strength of the spike is lowered, while if the upper limit of the size is too large, the spike effect would be lowered.

What is claimed is:

1. A magnetic recording substance comprising a non-magnetic support film having a magnetic recording layer on one side and a back coating comprising a thin layer of a resinous binder having dispersed therein a mixture of inorganic powders comprising as a major component an inorganic powder having grain size of 0.02-5 microns and as a minor component an inorganic powder having a grain size of 2-40 microns, said minor component forming with said major component and binder on said film a coating having spike grains extending outwardly from the non-magnetic surface to a height of 0.8-5 microns at a pitch of at least 200 microns to yield a tape having a coefficient of friction of at least 0 on 25.

2. The magnetic recording substance as claimed in claim 1, wherein the powdered solid is of at least one material selected from the group consisting of talc, titanium oxide, zinc oxide, lithophone, complex of zinc sulfide and zinc sulfate, aluminum oxide, silicon carbide, kaolin, carbon, barium sulfate, silicon dioxide, barium carbonate and mixtures thereof.

3. The magnetic recording substance as claimed in claim 1, wherein the non-magnetic support has a thickness of 3 to 100 microns.

4. The magnetic recording substance as claimed in claim 1, wherein the powdered solid is a mixture of powders differing in grain size.

5. The magnetic recording substance as claimed in claim 1, wherein the pitch of the spike grains is from 200 to 10000 microns.

6. The magnetic recording substance as claimed in claim 1, wherein the height of the spike grains is from 0.8 to 3 microns.

7. The magnetic recording substance as claimed in claim 1, wherein the spike grains have a diameter of at least 8 microns.

8. The magnetic recording substance as claimed in claim 7, wherein the diameter of the spike grains is from 8 to 20 microns.

9. The magnetic recording substance as claimed in claim 1, wherein the back layer has a surface electric resistance of at most $10^{10}\Omega$.

10. The magnetic recording substance as claimed in claim 9, wherein the surface electric resistance of the back layer is at most $10^{8}\Omega$.

11. The magnetic recording substance as claimed in claim 1, wherein the back layer has a thickness on dry base of 0.5 to 10 microns.

12. The magnetic recording substance as claimed in claim 1, wherein the proportion by weight of the spike grains to the back layer ranges from 1/1000 to 30/1000.

* * * * *